United States Patent [19]

Aarts

[11] 4,321,639

[45] Mar. 23, 1982

[54] APPARATUS FOR MAGNETICALLY RECORDING AND READING WIDE-BAND SIGNALS

[75] Inventor: Petrus J. J. Aarts, Eindhoven, Netherlands

[73] Assignee: U.S. Philips Corporation, New York, N.Y.

[21] Appl. No.: 115,171

[22] Filed: Jan. 25, 1980

[30] Foreign Application Priority Data

Mar. 23, 1979 [NL] Netherlands .......................... 7902292

[51] Int. Cl.³ .......................... G11B 5/52; G11B 21/04
[52] U.S. Cl. ..................................... 360/104; 360/107; 360/130.24
[58] Field of Search ............... 360/104, 107, 109, 108, 360/128, 129, 130.21–130.24, 84–85

[56] References Cited

U.S. PATENT DOCUMENTS

| | | | |
|---|---|---|---|
| 3,422,230 | 1/1969 | Tanigawa et al. | 360/108 |
| 3,567,869 | 3/1971 | Hirota et al. | 360/107 |
| 3,995,317 | 11/1976 | Schmidt | 360/130.24 |
| 4,016,600 | 4/1977 | Kirn | 360/109 |
| 4,080,639 | 3/1978 | Gunschmann | 360/107 |

*Primary Examiner*—Alfred H. Eddleman
*Attorney, Agent, or Firm*—David R. Treacy

[57] ABSTRACT

A helical scan tape recorder having a head support accommodating one or more magnetic heads mounted on a drive spindle. The head support is centered relative to the axis of rotation of the drive spindle by a diaphragm made of a thin elastic sheet material clamped to the head support. A central opening of the diaphragm is pressed over the drive spindle without play, portions of the centering diaphragm being subjected to a limited elastic bending deformation.

6 Claims, 9 Drawing Figures

APPARATUS FOR MAGNETICALLY RECORDING AND READING WIDE-BAND SIGNALS

BACKGROUND OF THE INVENTION

1. Field of the Invention

The invention relates to an apparatus for magnetically recording and reading wide-band signals on a magnetic tape in signal tracks which extend obliquely adjacent each other; and more particularly to such an apparatus comprising an at least partly cylindrical drive spindle with a free end, which spindle is rotatable about an axis of rotation; at least one magnetic head which is rotatable in a circular path around the axis of rotation of the drive spindle for writing and/or reading the oblique signal tracks on the magnetic tape; a head support for the magnetic head(s), which support is detachably secured to a cylindrical portion of the drive spindle near its free end and which is formed with a central bore for mounting the head support on the drive spindle; as well as means for detachably mounting the head support on the drive spindle and comprising centering means for centering the head support relative to the axis of rotation of the drive spindle, and fixing means for rigidly connecting the magnetic head support and the drive spindle to each other.

Apparatus of the afore-mentioned type is employed in so-called helical-scan video recorders for magnetically recording and reading video signals. Such video recorders are mass manufactured for the consumer market and thus are a typical mass product. Among the known consumer equipment for magnetically recording and reading signals they constitute the most advanced type, because very stringent requirements are imposed on the accuracy with which the signals are written on and should subsequently be readable from the magnetic tape by means of the rapidly rotating magnetic heads. The magnetic tape is practically always accommodated in a cassette which is of a specific standard type. An important requirement is that it should be possible that cassettes which have been used for making a recording on one video recorder can be placed on an other similar video recorder for the reproduction of the previously made recording without a perceptible reduction in the quality of reproduction in comparison with a reproduction using the video recorder with which the recording was made originally. In practice this requirement of interchangeability of standard cassettes and of video recorders of a specific type is generally referred to as the compatibility requirement.

To make the most economic use of the magnetic tape employed in the cassettes and thus to raise the playing time attainable with a specific cassette, many attempts have been made to maximize the density of the signals recorded on the magnetic tape with video recorders. In modern video recorders for the consumer market oblique tracks are written on the magnetic tape by means of two magnetic heads, which tracks typically have a width of approximately 40 microns. The distance between consecutive tracks is approximately 30 microns, so that the tracks slightly overlap each other. The length of the oblique track is approximately 100 mm and is consequently very great in comparison with the width of the track. These dimensions for the track width and for the track distance should be maintained within narrow limits over the total length of the oblique track in view of the compatibility requirement.

This means that a very high positional accuracy of the magnetic heads is required relative to those elements of the video recorder which provide guidance of the tape along the head support, so that the small tolerance limits of the tracks on the magnetic tape are achieved as a result of small tolerance ranges in respect of the position of the magnetic heads.

For the most frequently used video recorders, which comprise a plurality of magnetic heads, it is furthermore of importance that the synchronism of the signals read by the magnetic heads is guaranteed within narrow limits. Synchronizing errors may manifest themselves as visible timing errors in the reproduced television picture, giving rise to instabilities at the upper edges of the pictures.

During manufacture the magnetic heads are positioned on the head support with special precision devices, for example using optical measurement, the head support being mounted on a spindle. The height of the magnetic heads relative to the tape guide members of the video recorder should be adjusted with a tolerance of the order of magnitude of 5 microns, in such a way that the mutual difference in height between the magnetic heads should not exceed 5 microns. Moreover, in the case of a head support in the form of a rotary head disc with a diameter of 65 mm the eccentricity of the magnetic heads relative to the axis of rotation of the head support should be less than $1\frac{1}{2}$ micron. A further requirement which is imposed is that the magnetic heads are uniformly spaced over the circumference of the head support in an accurate manner. For example, when two magnetic heads are used, the lengths of arc between the two magnetic heads should not differ more than 3 microns from each other.

2. Description of the Prior Art

An apparatus of the type described above is for example known from U.S. Pat. No. 3,422,230. In this apparatus a flange is secured to the drive spindle, on which flange a head support can be mounted by means of screws. On its side which faces the head support the flange is accurately machined and the head support is already provided with the magnetic heads, so that at least the distance between the magnetic heads can accurately be adjusted in advance. This is necessary as the compatibility of the video recorder should not be lost in the case of replacement or repair of a head support. Thus, for securing and centering the head support such steps should be taken that after removal of the head support and refitting a new head support, for example for service purposes, compatibility is guaranteed. In view of the very small tolerances which are permissible in respect of the eccentricity of the magnetic heads relative to the drive spindle, precise centering of the head support within the range of the specified $1\frac{1}{2}$ microns is very important. Yet it is desirable that centering can be effected by a service engineer rapidly and without the use of position-alignment devices. In the known apparatus the head support is centered on the drive spindle by mounting the head support on an annular projection of the previously mentioned flange, which engages in the central bore of the head support with a specific fit. Different embodiments employ a centering member which is interposed between the spindle and the central bore. In view of the tolerances with which spindles and bores can be made in mass production it is extremely difficult if not impossible to provide such very small permissible eccentricity tolerances with these constructions. Therefore, such centering methods are not satisfactory for the latest video recorders.

SUMMARY OF THE INVENTION

It is the object of the invention to provide an apparatus of the types mentioned above which enables a head support to be mounted on a drive spindle with very high precision without the necessity of separate special precision measuring devices.

The invention is characterized in that the centering means comprise a centering diaphragm made of a thin elastic sheet material, which diaphragm is formed with a central opening for tightly fitting over the free end of the drive spindle, the opening being of such a shape and such dimensions that when the free end of the drive spindle is inserted portions of the centering diaphragm which adjoin the central opening are subject to an elastic bending deformation in the axial direction as a result of the interference between the centering diaphragm and the drive spindle; and that the means for connecting the centering diaphragm to the head support engage the diaphragm at a location spaced from the central opening of the centering diaphragm such a distance that the portions of the centering diaphragm disposed between the connecting means and the central opening are free to be subjected to the elastic bending deformations.

The use of the centering diaphragm enables the head support to be mounted absolutely free from play. When a hardened and ground drive spindle is used with a nominal diameter of 6 mm and manufactured with a diameter tolerance of 4 microns, an undersize of the transverse direction of the central opening in the diaphragm between 11 and 21 microns will suffice. The forces in the axial direction to be exerted during mounting can readily be obtained without the use of auxiliary means and without subjecting the drive spindle bearing to an impermissible load.

For securing the centering diaphragm to the head support it is advantageous to use an embodiment which is characterized in that the head support is provided with an annular contact surface concentric with the axis of rotation of the drive spindle; and that the connecting means for connecting the centering diaphragm to the head support comprise a thrust member which is disposed on the side of the centering diaphragm which is remote from said contact surface and which is provided with an annular thrust surface which is concentric with the axis of rotation of the drive spindle, and means for pressing the thrust member against the centering member and thus clamping the centering diaphragm between the contact surface and the thrust surface.

In order to reduce the axial forces to be exerted on the head support and thus on the drive spindle during assembly and disassembly an embodiment of the invention is of interest which is characterized in that the opening in the central diaphragm is non-circular, the centering diaphragm making contact with the drive spindle at at least three locations. The central opening may for example be substantially polygonal, preferably substantially triangular.

BRIEF DESCRIPTION OF THE DRAWING

The invention is described in more detail with reference to the drawing, in which.

DESCRIPTION OF THE PREFERRED EMBODIMENTS

Figure 1:
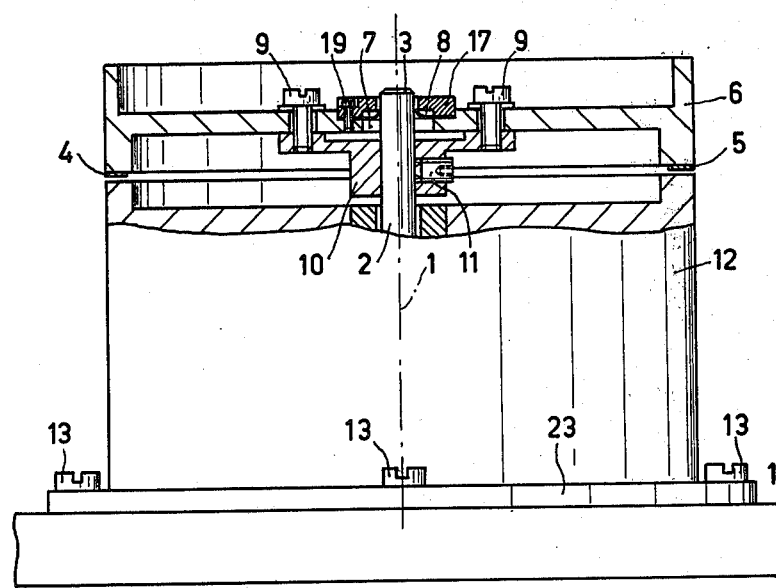
FIG. 1 is a side view, partly in cross-section, of a head drum unit of a video recorder, the head support comprising a head disc provided with two magnetic video heads.
Figure 2:
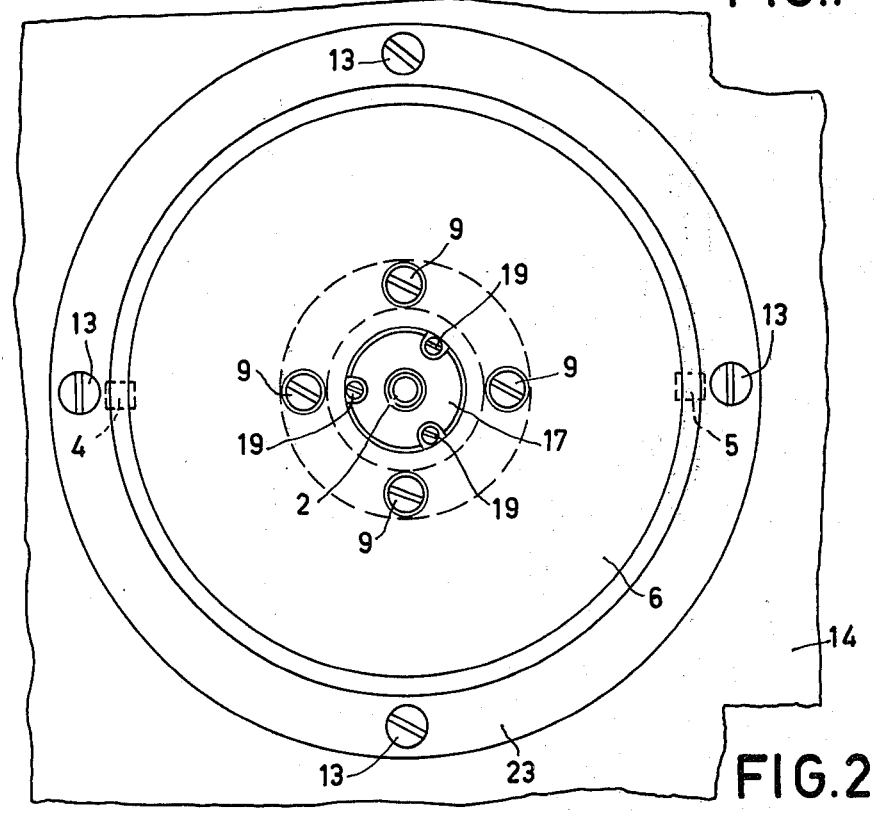
FIG. 2 is a plan view of the head drum unit of FIG. 1.

The head drum unit of FIG. 1 is shown only schematically, and all other components which are generally located in a video recorder in the vicinity of or on the head drum unit, when they do not directly relate to the invention, have been omitted for the sake of clarity. For a more extensive description of a head drum unit in a video recorder and of the tape guide means for guiding the magnetic tape along the head drum unit reference is made to the comprehensive literature relating to this subject, see for example the article "Mechanical Design Considerations for Helical Scan Videotape Recorders", SMPTE Journal, Volume 87, November 1978, pages 767–771 (hereby incorporated by reference) as well as the previously mentioned U.S. Pat. No. 3,422,230 (hereby incorporated by reference).

The apparatus of FIG. 1 for magnetically recording and reading wide band signals on a magnetic tape in interrupted signal tracks which extend obliquely adjacent each other comprises a cylindrical drive spindle 2, which is rotatable about an axis of rotation 1 and which has a free end 3. Two magnetic heads 4 and 5 are rotatable about the axis of rotation 1 for writing and reading signal tracks on a magnetic tape. A head support in the form of a head disc 6 is mounted on the drive spindle 2 near its free end 3, on which disc the magnetic heads 4 and 5 are mounted. Since the manner in which the magnetic heads 4 and 5 are mounted on the head disc 6 is irrelevant for the present invention, this is not shown in the drawing. The head disc 6 is formed with a central bore 7 for mounting the head disc on the drive spindle. For detachably mounting the head disc on the drive spindle a centering means 8 for centering the head support relative to the axis of rotation 1 of the drive spindle 2 as well as fixing means in the form of four bolts 9 for rigidly connecting the head disc 6 and the drive spindle 2 to each other are provided. The fixing means furthermore comprise a flange 10, which is secured to the drive spindle 2 by means of a locking screw 11. Thus, the head disc 6 is rotatable relative to a stationary drum 12 by means of the drive spindle 2, which drum accommodates a motor, not shown, for driving the head disc 6 and furthermore means for journalling the drive spindle 2. As this motor and these journalling means are irrelevant for the present invention, they are not shown in the drawing. The stationary drum 12 is secured to a chassis part 14 by means of four screws 13 through a flange 23.

Figure 3:
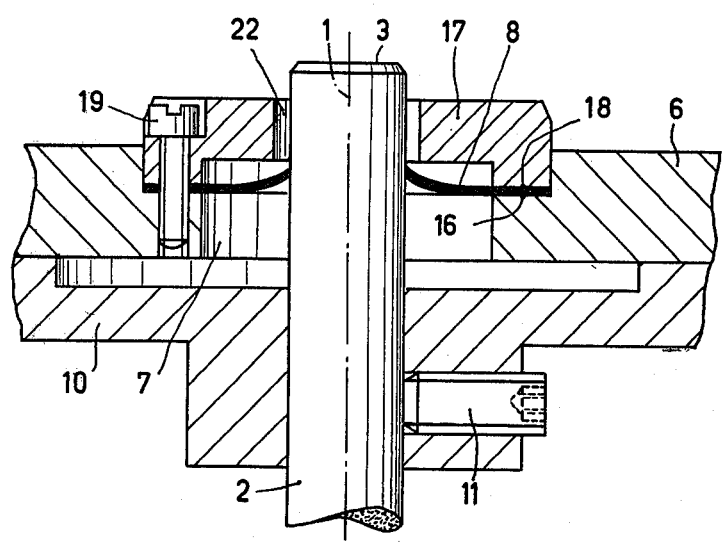
FIG. 3 is a sectional a detail of the head-disc mounting of FIG. 1 on an enlarged scale, the centering diaphragm being shown deformed to an exaggerated extent for the sake of clarity.
Figure 4:
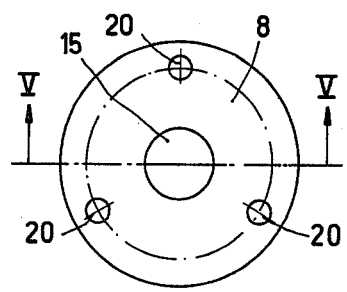
FIG. 4 is a plan view of a centering diaphragm with a circular central opening.
Figure 5:
FIG. 5 is a cross-section of the centering diaphragm of FIG. 4 in accordance with the arrows V—V.
Figure 6:
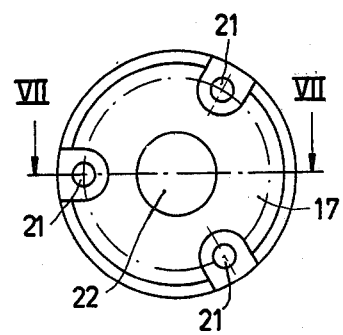
FIG. 6 is a plan view of a thrust member for mounting the centering diaphragm of FIGS. 4 and 5.

As shown in FIGS. 3–5, the centering means 8 comprise a centering diaphragm made of a thin elastic sheet material, which diaphragm has a central opening 15 for tightly fitting the free end 3 of the drive spindle 2. The centering diaphragm has such a shape and such dimensions that upon insertion of the free end of the drive spindle portions of the centering diaphragm adjacent the central opening 15 are subjected to an elastic bending deformation in the axial direction as a result of the forces which occur between the centering diaphragm and the drive spindle, see in particular FIG. 3. For connecting the centering diaphragm 8 to the head disc 6 connecting means clamp the diaphragm at some distance from the central opening 15. The portions of the centering diaphragm 8 located between these connecting means and the central opening are thus free, to a limited extent, to be subjected to the elastic bending deformations.

The head disc 6 is provided with an annular contact surface 16 which is concentric with the axis of rotation 1 of the drive spindle 2, against which surface the centering diaphragm 8 is positioned. The means for connecting the centering diaphragm 8 to the head disc 6 comprise a thrust member 17 located at the side of the centering diaphragm which is remote from the contact surface 16, the thrust member having an annular thrust surface 18 which is concentric with the axis of rotation 1 of the drive spindle 2, and three bolts 19 for pressing the thrust member 17 against the centering diaphragm 8 and thus clamping the centering diaphragm 8 between the contact surface 16 and the thrust surface 18.

For passage of the bolts 19 the centering diaphragm 8 is formed with three openings 20, which correspond to three openings 21 in the thrust member 17. For passage of the drive spindle 2 the thrust member is formed with a central opening 22.

The centering diaphragm 8 of FIGS. 4 and 5 has a thickness of approximately 0.1 mm and is made of chromium-nickel (18 Cr 8 Ni) spring steel. The outer diameter of the centering diaphragm is approximately 20 mm, while three openings 20 for the passage of the bolts 19 are located on a pitch circle of approximately 16 mm. The central opening 15 of the centering diaphragm 8 has a diameter of approximately 6 mm, and the inner diameter of the annular thrust surface 18 of the thrust member 17 is approximately 12 mm. The clearance between the edge of the central opening 15 of the centering diaphragm 8 and the thrust surface 18 of the thrust member 17 is consequently 3 mm. The degree of deformation of the part of the centering diaphragm which is located between the central opening 15 and the thrust surface 18 is shown highly exaggerated in FIG. 3. In reality the axial deflection will not be more than approximately 0.2 mm. When a centering diaphragm in accordance with FIGS. 4 and 5 is used, that is, a diaphragm with a circular opening 15 and with a thickness of approximately 0.1 mm, a force of approximately 1000 g is necessary for fitting the head disc 6 onto the drive spindle 2. For removing the head disc 6 it is found that a smaller force suffices. This is due to the manner of deformation of the centering diaphragm 8, which during removal of the head disc 6 is subject to buckling, which demands a smaller force than the force demanded by the deflection when mounting the head disc.

Figure 8:
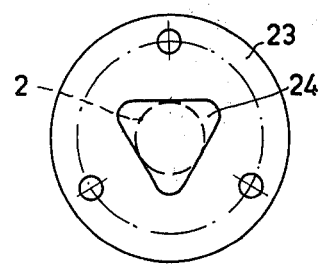
FIG. 8 is a plan view of an alternative version of a centering diaphragm, which now has a triangular central opening.
Figure 7:
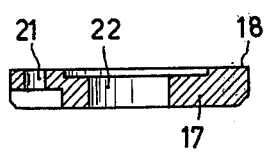
FIG. 7 is a cross-section of the thrust member of FIG. 6 in accordance with the arrows VII—VII.
Figure 9:
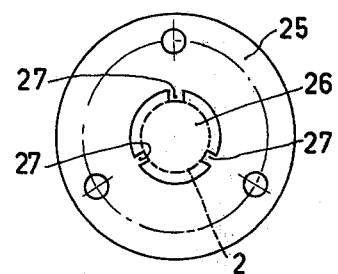
FIG. 9 is a plan view of another alternative, with a non-circular central opening, the centering diaphragm being provided with three contact lugs.

When a centering diaphragm 23 in accordance with FIG. 8 is used, which has a roughly triangular central opening 24, or a centering diaphragm 25 is used in accordance with FIG. 9, which has a central opening 26 which is bounded by a wall with three projecting bending lugs 27, forces will suffice, which may be several times smaller, depending on the design and the dimensions of the centering diaphragm and more particularly of the area around the central opening.

What is claimed is:

1. An apparatus for magnetically recording and reading wide band signals on a magnetic tape being transported in the apparatus, the signals being arranged in signal tracks which extend obliquely adjacent each other, comprising:
    a. an at least partly cylindrical drive spindle having a free end and a cylindrical portion near the free end, the spindle being rotatable about an axis of rotation, the tape being transported along a helical path about the spindle,
    b. at least one magnetic head arranged to be rotatable in a circular path around the axis of rotation of the drive spindle for writing and/or reading the oblique signal tracks on the magnetic tape,
    c. a head support for said at least one magnetic head having a central bore for mounting the head support on the drive spindle, the support being detachably secured to the cylindrical portion of the drive spindle near its free end, and
    d. means for detachably mounting the head support on the drive spindle, and comprising centering means for centering the head support relative to the axis of rotation of the drive spindle, and fixing means for rigidly connecting the magnetic head support and the drive spindle to each other, characterized in that:
    the centering means comprise a centering diaphragm made of a thin elastic sheet material, formed with a central opening for tightly fitting the free end of the drive spindle and having such a shape and such dimensions that upon the insertion of the free end of the drive spindle portions of the centering diaphragm adjoining the central opening are subject to an elastic bending deformation in the axial direction as a result of the forces occurring between the centering diaphragm and the drive spindle, and
    connecting means for connecting the centering diaphragm to the head support at a location spaced from the central opening of the centering diaphragm such a distance that the portions of the centering diaphragm disposed between the connecting means and the central opening are free to be subjected to the elastic bending deformations.

2. An apparatus as claimed in claim 1, characterized in that:
    the head support has an annular contact surface concentric with the axis of rotation of the drive spindle,
    the connecting means for connecting the centering diaphragm to the head support comprise a thrust member disposed at the side of the centering diaphragm which is remote from said contact surface, said thrust member having an annular thrust surface concentric with the axis of rotation of the drive spindle, and
    means for pressing the thrust member against the centering diaphragm and clamping the centering diaphragm between said contact surface and said thrust surface.

3. An apparatus as claimed in claim 1, characterized in that the central opening in the centering diaphragm is non-circular, the centering diaphragm being in contact with the drive spindle at at least three locations.

4. An apparatus as claimed in claim 3, characterized in that the central opening is substantially polygonal.

5. A device having a disc centered on a spindle, comprising:
- a. an at least partly cylindrical spindle having an axis, a free end and a cylindrical portion near the free end,
- b. a disc having a central bore for mounting the disc on the spindle, the disc being detachably secured to the cylindrical portion of the spindle near its free end, and
- c. means for detachably mounting the disc on the spindle, comprising centering means for centering the disc relative to the axis of the spindle, and fixing means for rigidly connecting the disc and the spindle to each other, characterized in that:

the disc has an annular contact surface concentric with the axis of the spindle, and the centering means comprise a centering diaphragm made of a thin elastic sheet material, which diaphragm is formed with a central opening for tighly fitting the free end of the spindle and having such a shape and such dimensions that upon insertion of the free end of the drive spindle portions of the centering diaphragm adjoining the central opening are subject to an elastic bending deformation in the axial direction as a result of the forces occurring between the centering diaphragm and the spindle, connecting means for connecting the centering diaphragm to the disc, comprising a thrust member disposed at the side of the centering diaphragm which is remote from said contact surface, said thrust member having an annular thrust surface which is concentric with the axis of the spindle, said disc contact surface and thrust member annular thrust surface being spaced from the central opening of the centering diaphragm such a distance that the portions of the centering diaphragm disposed between the contact and thrust surfaces and the central opening are free to be subjected to the elastic bending deformations, and means for pressing the thrust member against the centering diaphragm and thus clamping the centering diaphragm between said contact surface and said thrust surface.

6. A device as claimed in claim 5 wherein said central opening in the centering diaphragm is substantially polygonal.

* * * * *